F. C. CARROLL.
APPARATUS FOR TREATING SOIL.
APPLICATION FILED FEB. 21, 1911.
1,038,084.
Patented Sept. 10, 1912.
2 SHEETS—SHEET 1.
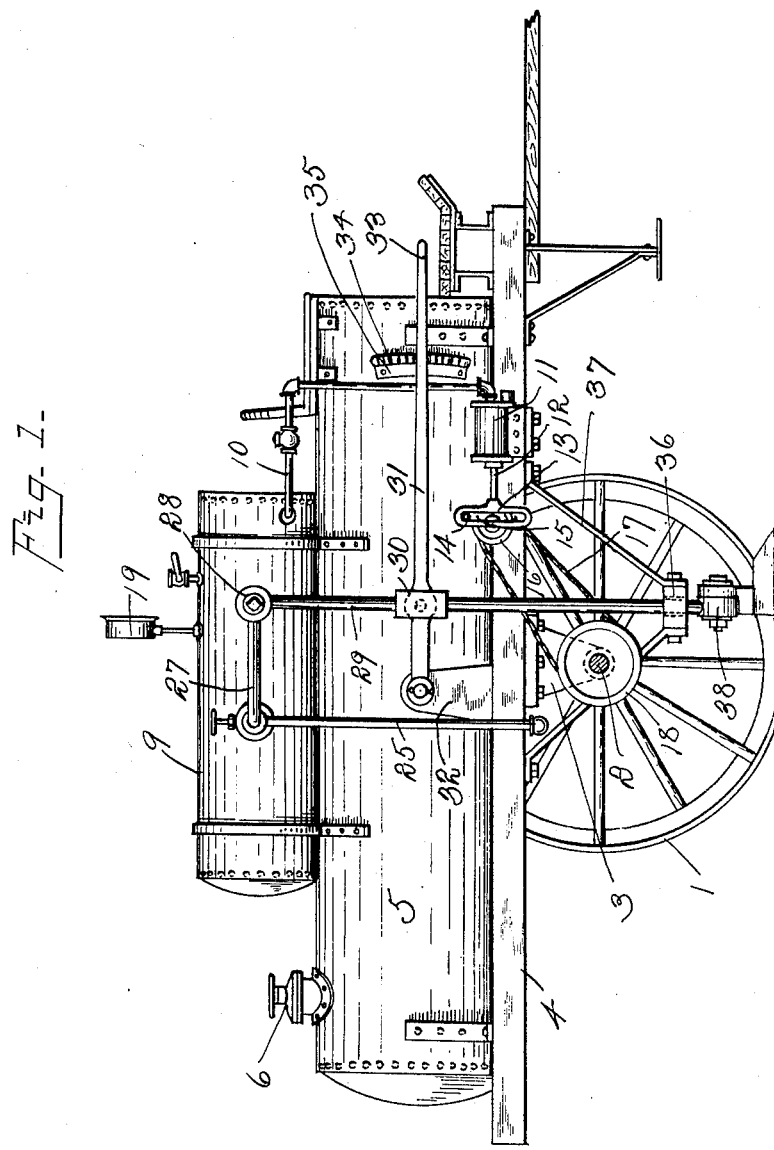

F. C. CARROLL.
APPARATUS FOR TREATING SOIL.
APPLICATION FILED FEB. 21, 1911.
1,038,084.
Patented Sept. 10, 1912.
2 SHEETS—SHEET 2.
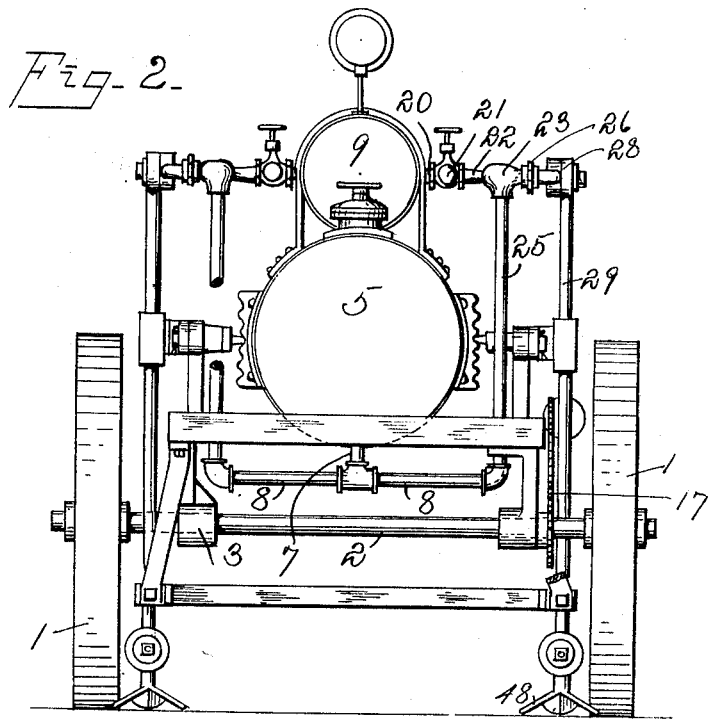
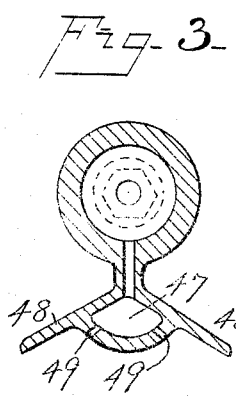
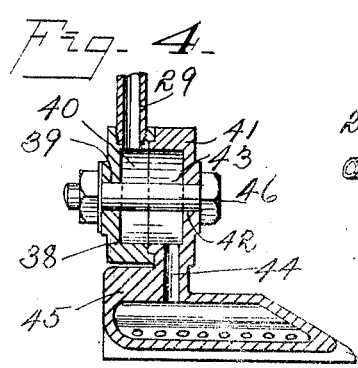
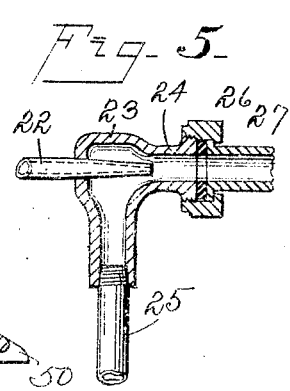

UNITED STATES PATENT OFFICE.

FRANK C. CARROLL, OF CLEVELAND, OHIO.

APPARATUS FOR TREATING SOIL.

1,038,084.

Specification of Letters Patent.  Patented Sept. 10, 1912.

Application filed February 21, 1911. Serial No. 609,883.

*To all whom it may concern:*

Be it known that I, FRANK C. CARROLL, a citizen of the United States, residing at Cleveland, in the county of Cuyahoga and State of Ohio, have invented certain new and useful Improvements in Apparatus for Treating Soil, of which the following is a specification.

The object of the present invention is to provide suitable means for treating the soil in a manner such that air or gas, preferably nitrogen, may be delivered to the soil under the surface thereof, whereby the benefit may be derived directly from such elements, and further so that, in addition to the air and gas, fertilizing material in the form of solutions may be delivered under the soil at the same time, so that they all may be taken up directly by the plant life, and still further so that none of these elements may be lost by evaporation due to the sun or wind.

This invention, therefore, relates broadly to apparatus for aerating or for fertilizing and aerating the soil under the surface thereof preparatory to planting or after the growing things have been started.

Still more specifically the invention contemplates the use of a sulky truck or other vehicle upon which is mounted a tank of suitable size for holding a quantity of ammonia, water, liquid manure or any suitable chemical fertilizer, an air tank, suitable means operated by the wheels for supplying air to said tank and a spraying device connected to a delivery tooth adapted to run under the soil and deliver aerated liquid in the form of a spray under the soil where it may be readily absorbed by it.

The invention may be further briefly summarized as consisting in certain novel details of construction and combinations of parts hereinafter set forth in the following description, drawings and claim.

Referring to the drawings, Figure 1 is a side elevation of my device with one of the wheels removed; Fig. 2 is a front elevation; Fig. 3 is a sectional view through the tooth or point; Fig. 4 is a vertical section taken longitudinally through the device; and Fig. 5 is a detail view of the atomizer.

Referring to the drawings, any preferred construction and combination of parts may be employed so long as they possess the necessary characteristics, but I have shown one form in the drawings which is highly effective in operation, and in such embodiment 1 represents suitable ground wheels adapted to drive a suitable axle 2 having brackets 3 which support a bed or frame 4 upon which all the mechanism is mounted. Mounted upon this bed 4 is a tank 5 for holding a quantity of solution for treating the soil. This tank is provided with a suitable charging device 6 through which it may be filled, and it is still further provided with a connection 7 in its bottom connected by a T to pipes 8—8 which lead to the spraying devices. Mounted upon the top of the tank 5, or in any suitable place, is an air tank 9 which is connected by a pipe 10 with a supply pump 11 having a piston rod 12 upon the end of which is a slotted member 13 receiving a crank pin 14 carried by an arm 15 rigid with a sprocket wheel 16 driven by a chain 17 engaging a sprocket wheel 18 rigid upon the axle rotated by the wheels.

From the foregoing mechanism it will be seen that the tank 9 is charged with air by the pump 11 and any suitable pressure may be maintained and may be indicated upon the gage 19.

There is a complete spraying or distributing mechanism for each side of the machine and a description of one will suffice for both. Connected in the side of the air tank is a pipe 20 leading to a valve 21 which in turn is connected to a nozzle 22 which enters an atomizer casing 23 and is adapted to direct its spray into a delivery connection 24. A pipe 25 connects the lower part of the casing to the rear of the end of the nozzle 22 with the bottom of the tank 5. The operation of this device is such that when air is supplied to the nozzle 22 solution is drawn from the bottom of the tank 5 and projected through the connection 24 in the form of a spray. This connection is of a character such that the pipe 27 may be rotated or rocked in connection with the pipe 24. This pipe 27 is bent around and passes forward where it is connected to a swivel joint connection 28 between the pipe 27 and a delivery pipe 29 extending down to a point below the surface of the soil. The connection 28 is similar in all respects to the connection between the pipe 29 and the delivery tooth or point, and the details of this connection will be taken in connection with the point. This pipe 29 has rigidly secured to it a sleeve 30 pivoted to a lever 31 having one end pivotally mounted upon a bracket 32 secured to the frame and its opposite end a handle 33 adapted to be adjusted in notches 34 in a plate 35 secured to the side of the tank 5. By means of this lever the pipe 29 may be raised and lowered for an adjustment which will be later described. The pipe 29 is guided below the frame by a suitable bearing member 36 secured by suitable brackets 37 to the frame. At the lower end of the pipe 29 is a circular or hollow coupling member 38 having an opening 39 therein and leading to a chamber 40 which is in communication with the opening of the pipe 29. Against the side face of this member 38 is a similar coupling member 41 having an opening 42 and a chamber or recess 43 which, together with the chamber or recess 40, form a communication between the opening in the pipe 29 and a channel 44 leading to a tooth or distributing point 45. A bolt 46 passes through the openings 39 and 42 and serves to hold two coupling members 38 and 41 in any adjusted position, and by means of this device, the tooth 45 may be swung to the left or right as the case may be. The tooth 45 is provided with a hollow chamber 47 arranged between the sloping sides 48 and the lower wall and this chamber is provided with discharge openings 49, a longitudinal row being arranged on each side of the center of the chamber and adapted to project or distribute the sprayed solution in diagonal directions away from the center. The front end of this tooth or point is provided with a digging point 50 for the purpose of facilitating its movement through the soil. By the adjustment of the tooth or distributing point from one side to the other, the discharge may be directed in any desired direction.

From the foregoing, it will be seen that when the lower or large tank 5 is filled with a suitable solution and the upper tank is charged with air, the operator may open one or both of the valves 20 with the result that the liquor is drawn from the tank and discharged in a spray through the pipe 27 and delivered to the distributing point or tooth from whence the solution is mingled with the soil under the surface thereof. In this way the soil is aerated; that is air is supplied to it under the surface and any suitable fertilizing or other solution may be delivered with this air to the soil, avoiding the evaporation of the solution by the action of the sun's rays or wind, and bringing the air in direct contact with the soil adjacent to the roots of the plant.

Any suitable motive power may be employed for driving the vehicle or for operating the pump.

Having described my invention, I claim:—

In apparatus for treating the soil, in a vehicle, a solution tank mounted thereon, an air tank also mounted on said vehicle, means for supplying compressed air to said tank, an atomizer connected to the air tank and solution tank, a distributing device leading from said atomizer to a point near the ground, and a distributing tooth comprising a shank swiveled to the distributing pipe, an inclined upper portion, and a receiving chamber under said upper portion and provided with discharge openings adapted to direct the discharge in lateral inclined directions.

In testimony whereof I affix my signature in presence of two witnesses as follows:

FRANK C. CARROLL.

Witnesses:
 CHRISTINE H. TRESCH,
 B. W. BROCKETT.